US010682889B2

(12) United States Patent
Fontaine et al.

(10) Patent No.: US 10,682,889 B2
(45) Date of Patent: Jun. 16, 2020

(54) TIRE FOR AUTONOMOUS VEHICLE

(71) Applicant: The Goodyear Tire & Rubber Company, Akron, OH (US)

(72) Inventors: Sebastien Willy Fontaine, Vichten (LU); Armand Rene Gabriel Leconte, Bigonville (LU); Frederic Ngo, Blaschette (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 239 days.

(21) Appl. No.: 15/897,618

(22) Filed: Feb. 15, 2018

(65) Prior Publication Data

US 2018/0250988 A1    Sep. 6, 2018

Related U.S. Application Data

(60) Provisional application No. 62/467,281, filed on Mar. 6, 2017.

(51) Int. Cl.
| *B60C 11/12* | (2006.01) |
| *B60C 11/03* | (2006.01) |
| *B60C 3/04* | (2006.01) |
| *B60C 11/11* | (2006.01) |

(52) U.S. Cl.
CPC ............ *B60C 11/1236* (2013.01); *B60C 3/04* (2013.01); *B60C 11/032* (2013.01); *B60C 11/11* (2013.01); *B60C 11/12* (2013.01); *B60C 11/1281* (2013.01); *B60C 2011/1245* (2013.01)

(58) Field of Classification Search
CPC ......... B60C 11/00; B60C 11/11; B60C 11/12; B60C 11/032; B60C 11/1281; B60C 11/1236; B60C 3/04; B60C 11/124; B60C 11/125; B60C 3/06

USPC .......................................................... D12/580
See application file for complete search history.

(56) References Cited

U.S. PATENT DOCUMENTS

| 4,204,567 | A | * | 5/1980 | Johannes | ................ | B60C 11/11 |
| | | | | | | 152/209.1 |
| 4,312,395 | A | * | 1/1982 | Baus | ...................... | B60C 11/11 |
| | | | | | | 152/209.17 |
| 5,027,876 | A | | 7/1991 | Chrobak et al. | | |
| 6,378,583 | B1 | * | 4/2002 | Fontaine | ................ | B60C 11/01 |
| | | | | | | 152/209.18 |

(Continued)

FOREIGN PATENT DOCUMENTS

| JP | 08040021 A | * | 2/1996 |
| JP | 2003104012 | * | 4/2003 |

(Continued)

OTHER PUBLICATIONS

Machine translation for Japan 2010-083462 (Year: 2019).*

(Continued)

*Primary Examiner* — Leith S Shafi
*Assistant Examiner* — Inja Song
(74) *Attorney, Agent, or Firm* — Edward T. Kennedy

(57) ABSTRACT

A tire for an autonomous vehicle includes a pair of sidewalls that extend to a ground-engaging tread. The tread includes a plurality of hexagonally-shaped tread elements, and the tire includes an outer diameter that is at least four times larger than a width of the tread. Selected hexagonally-shaped tread elements may be formed with features to increase traction on icy roads.

10 Claims, 4 Drawing Sheets

(56) References Cited

U.S. PATENT DOCUMENTS

| | | | |
|---|---|---|---|
| 7,281,555 B2 | 10/2007 | Ono | |
| 8,376,007 B2 | 2/2013 | Cuny et al. | |
| 8,739,845 B2 | 6/2014 | Furusawa | |
| 8,844,591 B2 * | 9/2014 | Sekine | B60C 11/11 152/209.17 |
| 9,308,779 B2 | 4/2016 | Shimizu | |
| 9,481,212 B2 | 11/2016 | Takahashi | |
| 9,688,104 B2 | 6/2017 | Takahashi | |
| 10,144,250 B2 | 12/2018 | Matsuda et al. | |
| 10,166,820 B2 | 1/2019 | Asayama | |
| 2017/0197466 A1 * | 7/2017 | Hatanaka | B60C 3/04 |

FOREIGN PATENT DOCUMENTS

| | | | |
|---|---|---|---|
| JP | 2010-083462 A | * | 4/2010 |
| JP | 2010-274800 A | * | 12/2010 |

OTHER PUBLICATIONS

Machine translation for Japan 08040021 (Year: 2019).*
Machine translation for Japan 2010-274800 (Year: 2019).*
English translation of JP-2003104012 (Year: 2003).*

* cited by examiner

TIRE FOR AUTONOMOUS VEHICLE

FIELD OF THE INVENTION

The invention relates to pneumatic tires and treads of such tires. More particularly, the invention is directed to a tire for autonomous vehicles that is formed with a tread structure which optimizes vehicle usage and performance.

BACKGROUND OF THE INVENTION

In the pneumatic tire art, it is known that structural aspects of the tread of the tire affect vehicle performance. For example, a tread may be formed with specific grooves or features to increase traction, or to promote fuel efficiency. With the development of autonomous vehicles and fleets of autonomous vehicles, there are particular considerations.

An autonomous vehicle is a vehicle such as a car or truck that is capable of legally operating and navigating on urban streets, highways and other roads without a human driver. It is expected that one of the primary environments for such autonomous vehicles will likely be an urban or city environment. In addition, it is expected that autonomous vehicles will be employed in fleets which transport passengers in such urban environments on an ongoing basis.

A primary consideration for a fleet of vehicles is optimizing the amount of time that each vehicle is in service. To this end, it is desirable that the tires for such vehicles provide high mileage before replacement is needed. In addition, for an urban environment, reduced noise from the tires during vehicle operation is beneficial. Moreover, for autonomous vehicles, uniform tire wear is desirable, as well as good all-weather performance.

As a result, there is a need in the art for a tire for an autonomous vehicle that includes a tread structure which provides high mileage before replacement, reduced noise characteristics, uniform wear and good all-weather performance in an urban environment.

SUMMARY OF THE INVENTION

According to an aspect of an exemplary embodiment of the invention, a tire for an autonomous vehicle includes a pair of sidewalls that extend to a ground-engaging tread. The tread includes a plurality of hexagonally-shaped tread elements, and the tire includes an outer diameter that is at least four times larger than a width of the tread. The tire optionally includes features formed in selected ones of the hexagonally-shaped tread elements to increase traction.

Definitions

The following definitions are applicable to the present invention.

"Axial" and "axially" mean lines or directions that are parallel to the axis of rotation of the tire.

"Autonomous vehicle" is a car or truck that is capable of legally operating and navigating on urban streets, highways and other roads without a human driver.

"Circumferential" means lines or directions extending along the perimeter of the surface of the annular tread perpendicular to the axial direction.

"Equatorial plane" means the plane perpendicular to the axis of rotation of the tire and passing through the center of the tire tread.

"Footprint" means the contact patch or area of contact created by the tire tread with a flat surface as the tire rotates or rolls.

"Groove" means an elongated void area in a tread that may extend circumferentially or laterally about the tread in a straight, curved, or zigzag manner.

"Inboard side" means the side of the tire nearest the vehicle when the tire is mounted on a wheel and the wheel is mounted on the vehicle.

"Inner" means toward the inside of the tire.

"Lateral" and "laterally" are used to indicate axial directions across the tread of the tire.

"Lateral edges" means a line tangent to the axially outermost tread contact patch or footprint as measured under normal load and tire inflation, the lines being parallel to the equatorial centerplane.

"Outboard side" means the side of the tire farthest away from the vehicle when the tire is mounted on a wheel and the wheel is mounted on the vehicle.

"Outer" means toward the outside of the tire.

"Radial" and "radially" are used to mean directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means a small elongated opening in the tread that improves traction characteristics.

"Tread" means a molded rubber component which includes that portion of the tire that comes into contact with the road when the tire is normally inflated and under normal load.

"Tread element" or "traction element" means a rib or a block element having a shape defined by adjacent grooves or sipes.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

Figure 1:
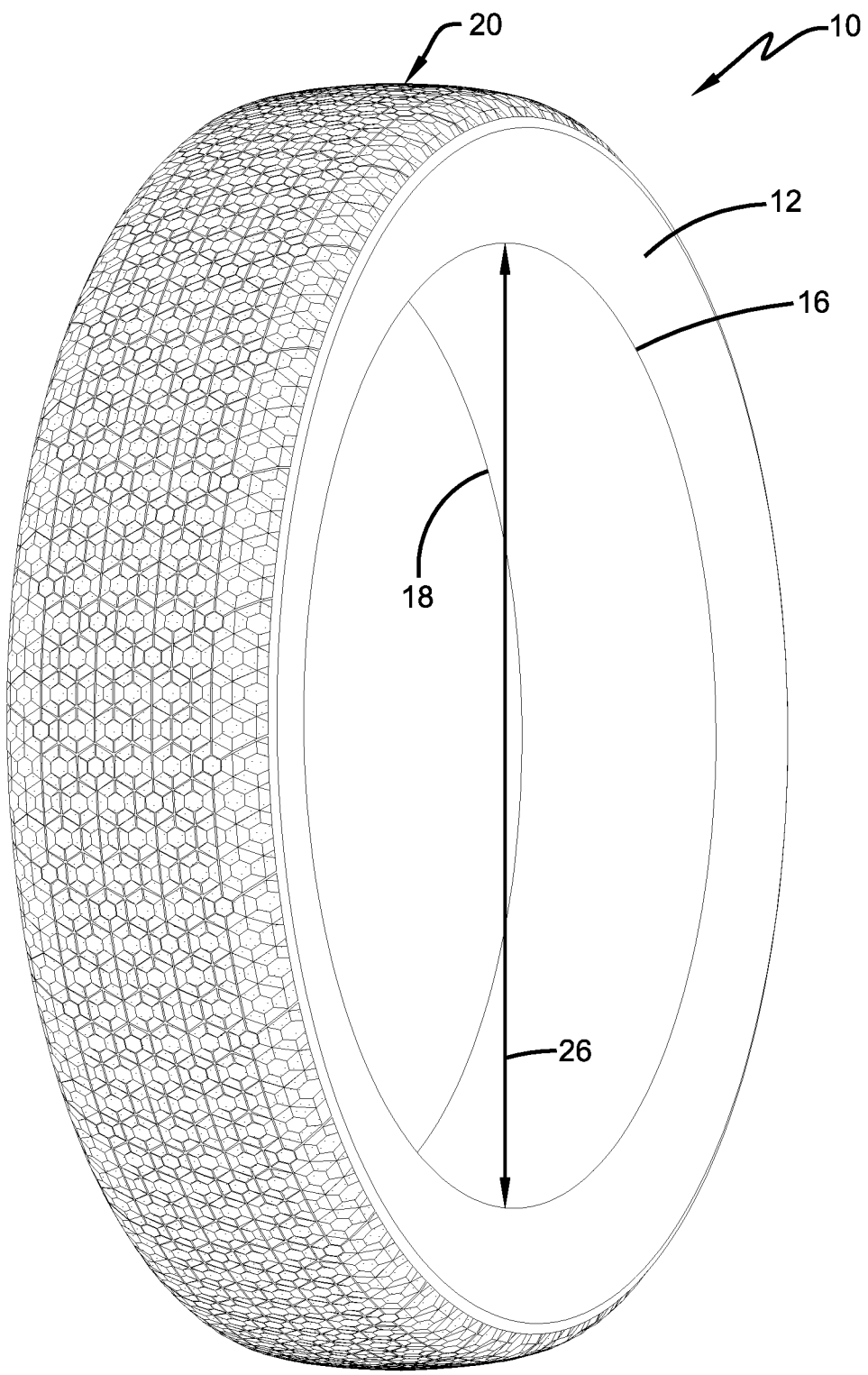
FIG. 1 is a perspective view of a first exemplary embodiment of a tire for an autonomous vehicle of the present invention.
Figure 2:
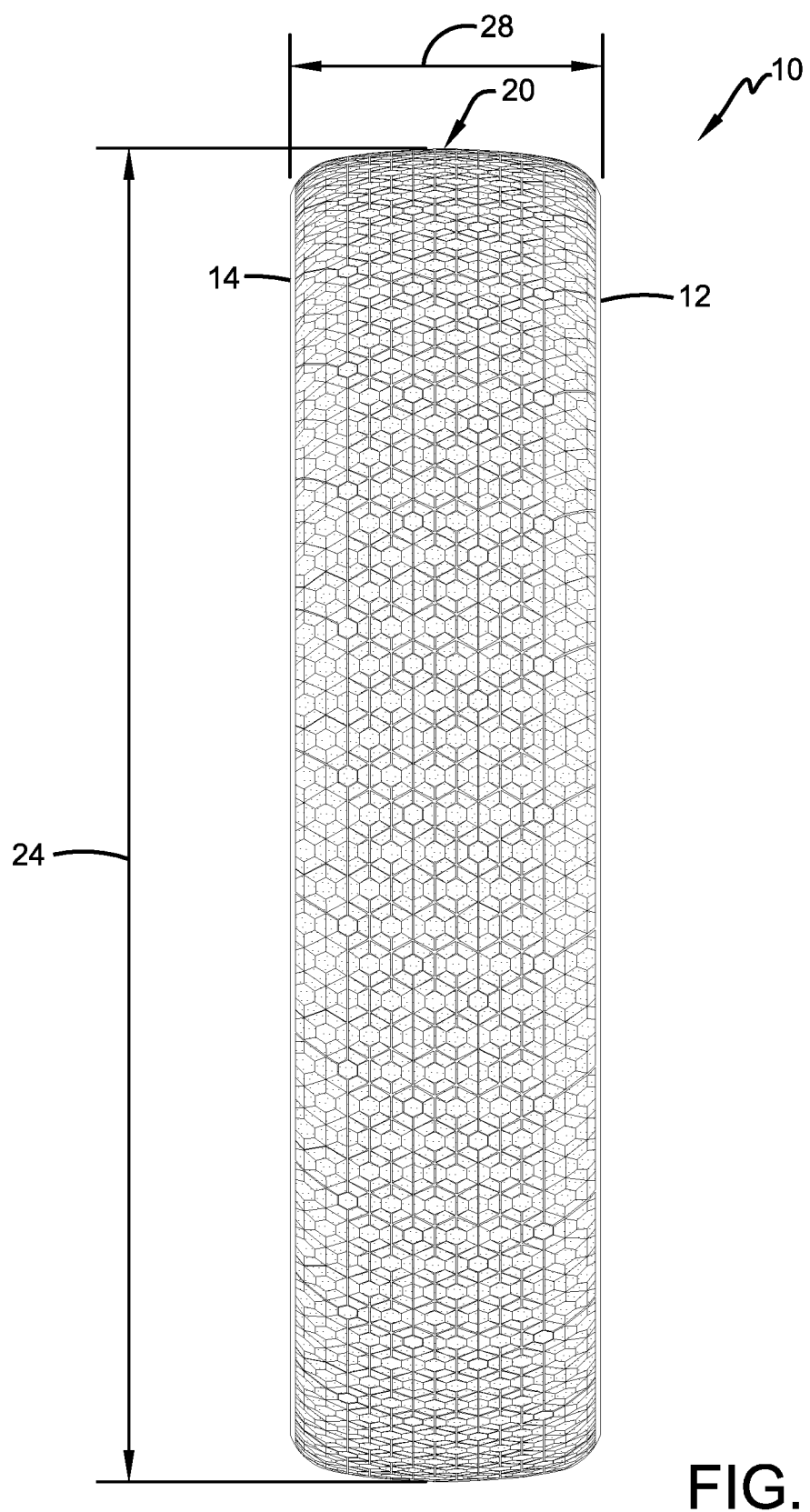
FIG. 2 is an elevational view of the tire shown in FIG. 1.
Figure 3:
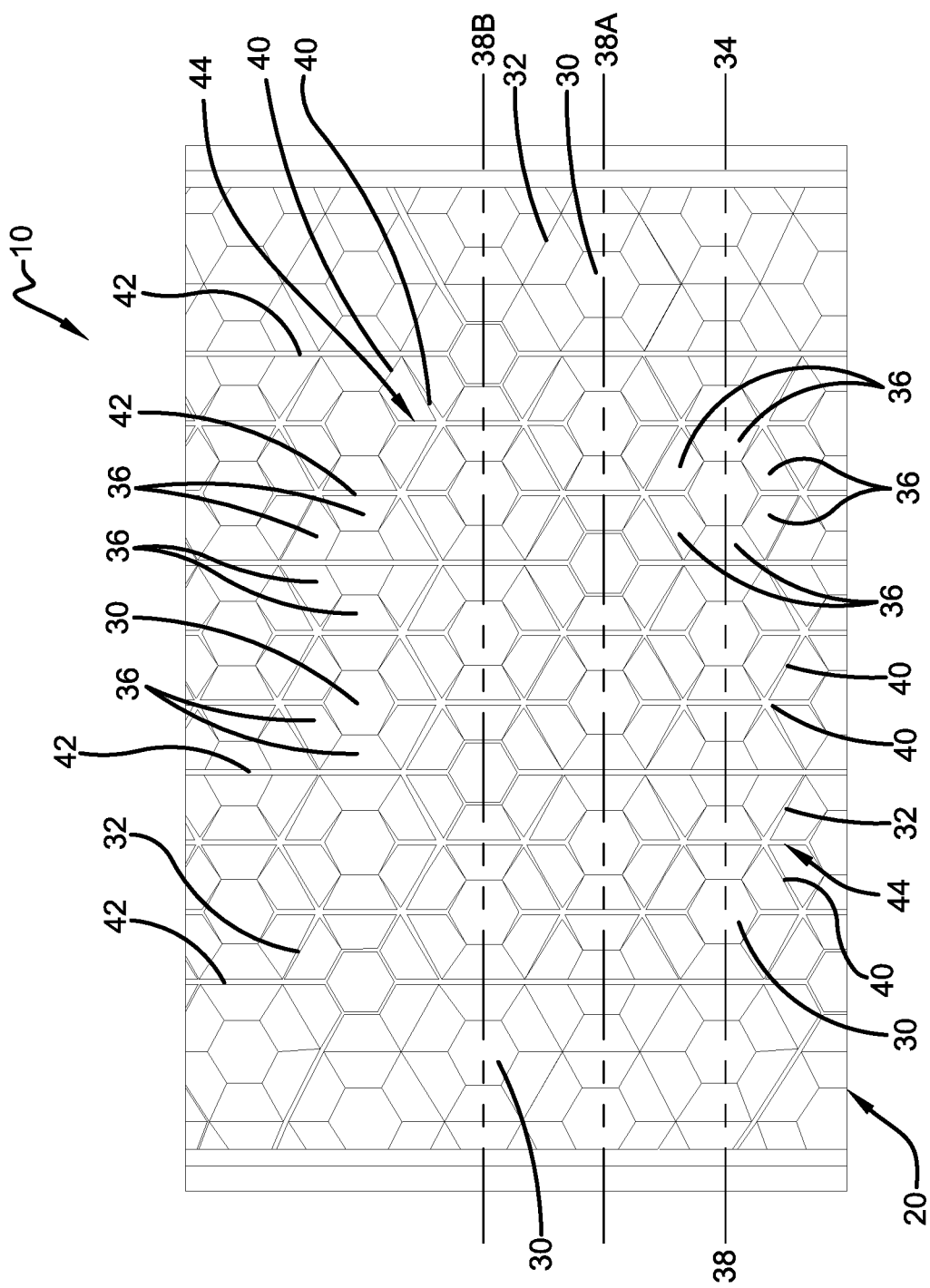
FIG. 3 is an enlarged fragmentary elevational view of a portion of the tread structure of the tire shown in FIG. 2.

Turning to FIGS. 1 through 3, a first exemplary embodiment of a tire for an autonomous vehicle of the present invention is indicated generally at 10. The tire includes a pair of sidewalls 12 and 14 extending from respective bead areas 16 and 18 to a tread 20.

Preferably, the tire 10 includes a large outside diameter 24 and a narrow tread width 28. For example, the outside diameter preferably is at least 4 times larger than the tread with, and more preferably at least 4.5 times larger than the tread width. The large outside diameter 24 in combination with the narrow tread width 28 reduces the rolling resistance of the tire 10. As a result, when a vehicle such as an electric vehicle employs the tire 10, such a reduced rolling resistance increases the energy efficiency and range of the electric vehicle, particularly in an urban environment. In addition, the large outer diameter 24 in combination with the narrow tread width 28, and thus a narrow tire footprint, creates a reduced risk that the tire will hydroplane or aquaplane on wet roads, particularly in a lower-speed urban environment. An exemplary size for the tire 10 includes an outer diameter 24 of about 718.8 millimeters or 28.3 inches, a wheel diameter 26 of about 533.4 millimeters or 21.0 inches, and a width of about 154.9 millimeters or 6.1 inches.

The tread 20 of the tire 10 includes a plurality of small hexagonally-shaped tread elements 30 that in turn form a plurality of large hexagonally-shaped tread elements 32. More particularly, the small hexagonally-shaped tread elements 30 are distributed circumferentially about the tread 20 in laterally-extending rows 34. Each small tread element 30 is surrounded by six components 36, thereby forming each large hexagonal tread element 32. The large tread elements 32 are also distributed circumferentially about the tread 20 in laterally-extending rows 38. The rows 38 of large hexagonally-shaped elements 32 alternate with one another in an offset manner, so that the center of each element in a first row 38A circumferentially aligns with an edge of an element in a second row 38B.

Each small hexagonally-shaped tread element 30 is defined by sipes 40, as is each component 36 of the large hexagonally-shaped tread elements 32. Therefore, the large hexagonally-shaped tread elements 32 are also defined by the sipes 40. The tread 20 also includes a plurality of non-continuous circumferential grooves 42, some of which divide selected small hexagonally-shaped tread elements 30 in half in a circumferential direction. Preferably, the non-continuous circumferential grooves 42 are of a depth of about 2 millimeters for initial break-in of the tire 10, while the sipes 40 are of a depth of about 7 millimeters. In order to increase all-weather performance and distribute water from wet roads, the thickness of the sipes 40 may vary, forming a plurality of linked star-shaped patterns 44.

The hexagonal pattern of the tread 20 is referred to as a closed pattern. Such a closed pattern eliminates continuous circumferential grooves. More particularly, because the large outer diameter 24 and the narrow tread width 28 of the tire creates a reduced risk that the tire will hydroplane or aquaplane on wet roads, continuous circumferential grooves are not necessary on the tread 20. The elimination of continuous circumferential grooves combined with the large outer diameter 24 of the tire 10 enables more rubber of the tread 20 to be in contact with the road, which decreases tire wear and desirably increases tire mileage. The elimination of continuous circumferential grooves also reduces noise levels as the tire 10 travels, thereby offering a quieter and more comfortable ride.

Moreover, the hexagonal pattern of the tread 20 enables the tire 10 to have a uniform grip and stiffness distribution along the tread. Such a uniform grip and stiffness distribution promotes uniform wear of the tire 10, thereby decreasing the risk of undesirable irregular wear. In this manner, the tire 10 for an autonomous vehicle includes a tread 20 that provides high mileage before replacement, reduced noise characteristics, uniform wear and good all-weather performance in an urban environment.

Figure 4:
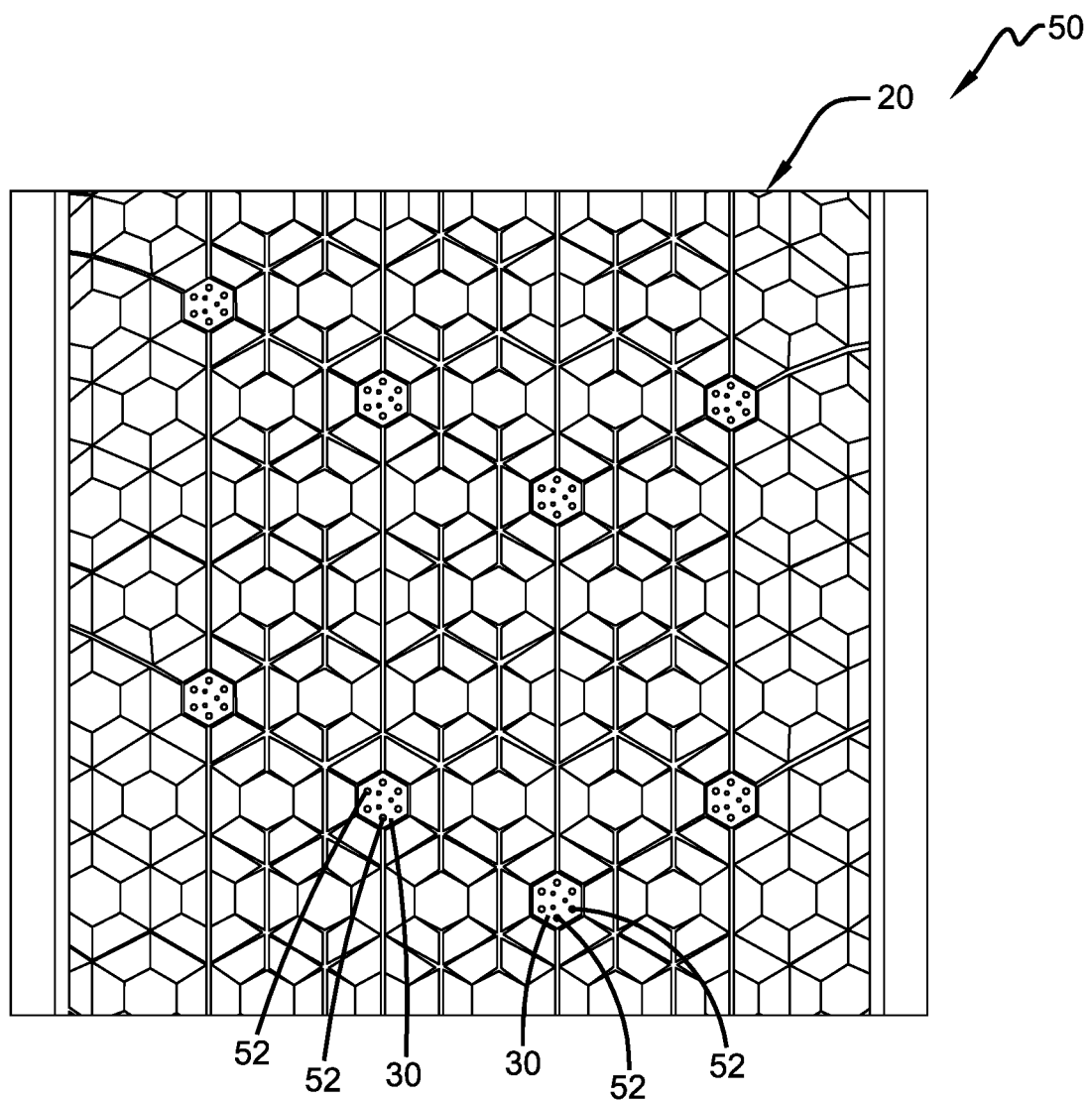
FIG. 4 is an enlarged fragmentary elevational view of a portion of the tread structure of a second exemplary embodiment of a tire for an autonomous vehicle of the present invention.

With reference now to FIG. 4, a second exemplary embodiment of a tire for an autonomous vehicle of the present invention is indicated generally at 50. The second embodiment of the tire 50 is the same in construction and operation as the first embodiment of the tire 10, with the exception that features 52 are provided on the tread 20 for additional traction.

More particularly, in the second embodiment of the tire 50, selected ones of the small hexagonally-shaped tread elements 30 are formed with features 52, such as a plurality of voids, to absorb water film on top of ice and thereby increase traction on icy roads. Such features 52 are described by way of example in U.S. Pat. No. 8,376,007, which is owned the same Assignee as the present invention, The Goodyear Tire & Rubber Company, and is fully incorporated herein. Similar to the first embodiment of the tire 10, the second embodiment of the tire 50 for an autonomous vehicle thus includes a tread 20 that provides high mileage before replacement, reduced noise characteristics, uniform wear and good all-weather performance in an urban environment.

The present invention also includes a method of forming a tire 10, 50 for an autonomous vehicle that includes the features described herein, and a method of using a tire for an autonomous vehicle that includes the features described herein. Each method includes steps in accordance with the description that is presented above and shown in FIGS. 1 through 4.

It is to be understood that the structure of the above-described tire may be altered or rearranged, or components or steps known to those skilled in the art omitted or added, without affecting the overall concept or operation of the invention. The invention has been described with reference to preferred embodiments. Potential modifications and alterations may occur to others upon a reading and understanding of this description. It is to be understood that all such modifications and alterations are included in the scope of the invention as set forth in the appended claims, or the equivalents thereof.

What is claimed is:

1. A tire for an autonomous vehicle, comprising:
   a pair of sidewalls extending to a ground-engaging tread;
   the tread including a plurality of hexagonally-shaped tread elements, wherein each hexagonally-shaped tread element includes:
      a center element formed in a hexagonal shape;
      a plurality of trapezoidally-shaped components surrounding the center element, the trapezoidally-shaped components being disposed about the center element; and
      wherein the trapezoidally-shaped components form a hexagonal shape about the center element; and
   the tire including an outer diameter at least 4 times larger than a width of the tread.

2. The tire for an autonomous vehicle of claim 1, wherein the outer diameter of the tire is at least 4.5 times larger than the width of the tread.

3. The tire for an autonomous vehicle of claim 2, wherein the outer diameter of the tire is about 718.8 millimeters and the width of the tread is about 154.9 millimeters.

4. The tire for an autonomous vehicle of claim 1, wherein the plurality of hexagonally-shaped tread elements are distributed circumferentially about the tread in laterally-extending rows.

5. The tire for an autonomous vehicle of claim 4, wherein the plurality of hexagonally-shaped tread elements of the laterally-extending rows alternate with one another in an offset manner.

6. The tire for an autonomous vehicle of claim 1, wherein the hexagonally-shaped tread elements are defined by sipes.

7. The tire for an autonomous vehicle of claim 6, wherein the thickness of the sipes varies to form a plurality of linked star-shaped patterns.

8. The tire for an autonomous vehicle of claim 1, wherein the tread further comprises a plurality of non-continuous circumferential grooves.

9. The tire for an autonomous vehicle of claim 1, wherein the tread is formed without continuous circumferential grooves.

10. The tire for an autonomous vehicle of claim 1, wherein selected ones of the hexagonally-shaped tread elements are formed with features to increase traction on icy roads.

\* \* \* \* \*